No. 894,937. PATENTED AUG. 4, 1908.
F. C. BRADBURN, J. H. TYLER & J. B. LOW.
PHOTOGRAPHIC APPLIANCE.
APPLICATION FILED APR. 22, 1907.
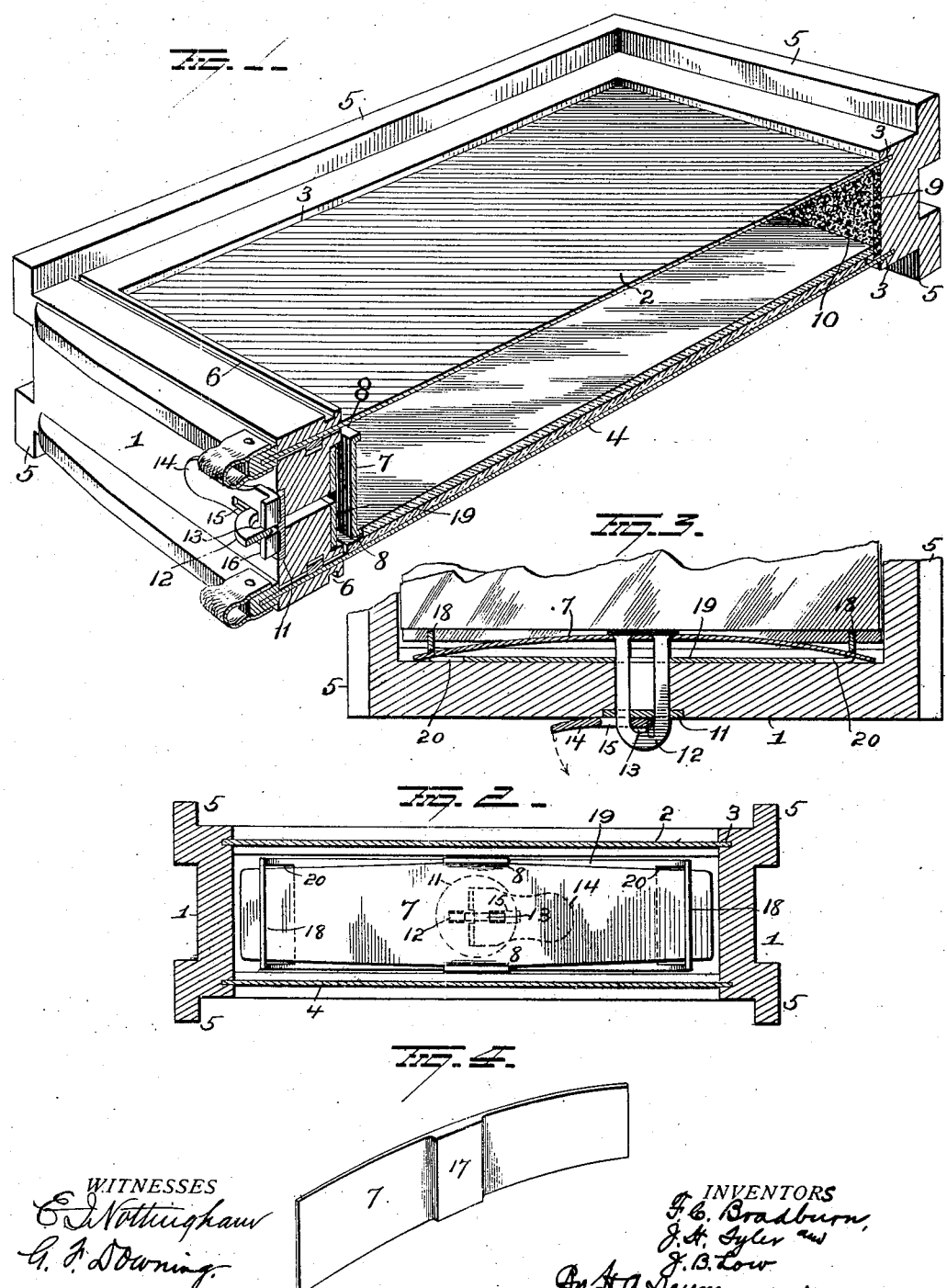
WITNESSES
INVENTORS
F. C. Bradburn,
J. H. Tyler and
J. B. Low
By H. A. Seymour Attorney

UNITED STATES PATENT OFFICE.

FREDERICK CRANDALL BRADBURN, JOHN HORSLEY TYLER, AND JESSE BARNEY LOW, OF ROCHESTER, NEW YORK.

PHOTOGRAPHIC APPLIANCE.

No. 894,937.  Specification of Letters Patent.  Patented Aug. 4, 1908.

Application filed April 22, 1907. Serial No. 369,530.

*To all whom it may concern:*

Be it known that we, FREDERICK CRANDALL BRADBURN, JOHN HORSLEY TYLER, and JESSE BARNEY LOW, of Rochester, in the county of Monroe and State of New York, have invented certain new and useful Improvements in Photographic Appliances; and we do hereby declare the following to be a full, clear, and exact description of the invention, such as will enable others skilled in the art to which it appertains to make and use the same.

Our invention relates to an improvement in photographic appliances and more particularly to improved magazine for photographic plates, the object of the invention being to provide simple and efficient means whereby photographic plates can be placed into or removed from either end of the device without danger of becoming light-struck.

A further object is to so construct the device that it can be operated in daylight to receive plates from a plate holder or to discharge plates into a plate holder one at a time.

With these objects in view our invention consists in certain novel features of construction and combinations and arrangements of parts as will be more fully hereinafter described and pointed out in the claims.

In the accompanying drawings, Figure 1 is a longitudinal sectional view of the device. Fig. 2 is a transverse sectional view. Fig. 3 is a detailed view of the holding and releasing device for the plates, and Fig. 4 is a view of a slight modification of said device.

The body portion 1 of the carrier is of sufficient capacity to receive a number of photographic plates and the top as well as the bottom consists of removable slides, the top slide 2 being movable in suitable slots 3 in the walls of the body portion and the bottom slide 4 being movable in similar slots or grooves near the bottom of the body portion. These slides are not unlike the shutter commonly in use with plate holders. The device is provided along three of its sides, at both top and bottom, with flanges 5 to receive a plate holder, and grooves 6 are made in the top and also in the bottom of the device, near the inner end thereof, for the reception of the rib on the plate holder to effect a light seal.

In one end of the magazine a bowed-spring 7 is located and bears at its ends against the end wall of the magazine. The spring 7 is made sufficiently less in width than the depth of the magazine to permit a photographic plate to be disposed on one or the other of the slides 2—4 without being engaged by the said spring. The spring 7 is provided centrally between its ends and at its respective edges with lips 8, each of which is adapted to engage the end of a photographic plate next to the one disposed against the slide and press said plate against the opposite end wall 9 of the magazine with sufficient pressure to permit the upper plates to be supported thereby. It sometimes happens that a plate will be slightly longer than the standard size and for this reason the end wall 9 is provided with a cushion 10 of felt or other suitable yielding material into which the end of a long plate will become depressed without affecting the operation of the device.

A plate 11 is secured in the front end of the magazine and through this plate an arm 12 secured to the spring 7 is adapted to pass freely. The arm 12 is made with an opening 13 to receive a lever 14 and said lever is provided with a slot 15 for the passage of the curved end of said arm. The lever 14 has a bearing against the plate 11 so that when it is moved it will act as a cam to withdraw the arm 12 and the bow-spring 7 to which said arm is secured, thus relieving the pressure of said spring against a plate and releasing said plate. The lever 14 is provided with a lug 16 to engage the plate 11 and act as a stop for said lever so as to properly hold the spring 7 away from the ends of the plates in the magazine.

When several plates are in the magazine, the bottom plate (regardless of the position in which the magazine may be held) will rest upon one of the slides and the adjacent lip 8 of the spring 7 will engage the next plate and hold it firmly. If a plate holder be now placed against the bottom of the magazine with its shutter withdrawn, the withdrawal of the bottom slide of the magazine will permit the bottom plate to drop into the plate holder,—after which the said bottom slide will be returned, the shutter of the plate holder closed and the plate holder then removed. Now when it is desired to transfer a plate from the magazine to a plate holder, it is first necessary to operate the cam-lever 14 to withdraw the spring 7 and permit the plate to drop upon the lower slide and become disposed in a plane below the lip 8 on said spring. The cam-lever will then be moved in the reverse direction and the spring permitted to cause its lip to engage the end of the next higher plate. The plate which has thus been released can be transferred to a plate holder in the manner before explained.

It might sometimes happen that when the spring 7 is withdrawn as above described, the second plate which would be resting upon one of the lips 8 of the spring, might follow the lip and not rest upon the bottom plate, and thus not be in position to be engaged by the lip 8 when the spring has been again released, just prior to dropping the bottom plate from the magazine. To avoid such an occurrence, we provide stops 18, to receive the edges of the plates and prevent them from being moved toward the spring 7 when the latter recedes. These stops may be conveniently formed at respective ends of a plate 19 secured in the end of the magazine behind the spring 7, and said plate is provided with slots 20 for the passage of said spring. The plate 19 also serves to prevent displacement of the spring 7.

It is evident that plates can be transferred from an ordinary plate holder to the magazine and when this is done the spring 7 will be withdrawn by means of the cam lever 14 to permit the passage of the plates past the lip 8. The magazine may be changed with dry plates in a dark room or one at a time from a plate holder in the daylight. These dry-plates can be transferred, one at a time, into a plate holder from one side of the magazine and after having been exposed in a camera can be deposited from the plate holder to the other side of the magazine. The entire supply of plates in the magazine can thus be exposed one at a time and replaced into the magazine and they can be subsequently removed from the magazine by means of a plate holder, as before described, and transferred by the latter to a developer.

Instead of providing the spring 7 with lips 8 at its respective edges, the central portion of said spring may be thickened as shown at 17, Fig. 4, and the ends of this thickened portion will serve the same purpose as the lips 8.

Having fully described our invention what we claim as new and desire to secure by Letters-Patent is,—

1. The combination with a magazine for photographic plates open at its top and bottom, and slides closing the top and bottom of the magazine, of a bowed spring mounted in the magazine and adapted between its ends to engage the edge of a plate a short distance from one or the other of said slides and force said plate against the opposite wall of the magazine, and a cam device connected with the central portion of the spring for withdrawing the latter to release a plate and permit it to drop upon the adjacent slide and then engage the next plate.

2. The combination with a magazine and slides closing the top and bottom thereof, of a bowed spring located in one end of the magazine, a cushion located in the other end of the magazine, a projection on said spring intermediate of its ends to engage the edge of a plate a short distance from said slides and push said plate against said cushion, and means for withdrawing the spring so as to release the plate, said means comprising an arm secured to the intermediate portion of the spring and a lever for withdrawing said arm and spring.

3. The combination with a magazine and slides closing top and bottom thereof, of a bowed spring mounted in one end of the magazine and provided with inwardly projecting lips at its respective edges, said lips being spaced from the slides sufficiently to permit a plate to be disposed between an edge of said spring and a slide, a slotted arm secured to the central portion of said spring and passing through the end of the magazine, a lever having a slot to receive the slotted arm and coöperate therewith by cam action to withdraw the spring to drop a plate upon one of the slides of the magazine and means for limiting the movement of said lever.

4. The combination with a magazine for photographic plates, having slide for closing the bottom of the same, of a bowed spring mounted in the magazine and having a lip at the center of its edge to engage the edge of a photographic plate a short distance from the slide, means for withdrawing said spring, and a stop for preventing a photographic plate from following the spring when the latter is made to recede.

5. The combination with a magazine for photographic plates having a slide for closing the bottom thereof, of a bowed spring in the magazine having a lip on its edge to engage the edge of a photographic plate, means for withdrawing said spring, and a plate secured in the magazine behind the spring and provided with slots for the passage of the spring, and stops at the ends of said plate to receive the edges of the photographic plates.

In testimony whereof, we have signed this specification in the presence of two subscribing witnesses.

FREDERICK CRANDALL BRADBURN.
JOHN HORSLEY TYLER.
JESSE BARNEY LOW.

Witnesses:
JOHN CORNELIUS COOK,
WILLIAM B. PLASS.